US010062928B2

(12) United States Patent
Castaneda et al.

(10) Patent No.: US 10,062,928 B2
(45) Date of Patent: Aug. 28, 2018

(54) METHOD FOR CHARGING BATTERIES

(71) Applicants: Homero Castaneda, Hudson, OH (US);
Roberto Hernandez Maya, Akron, OH (US)

(72) Inventors: Homero Castaneda, Hudson, OH (US);
Roberto Hernandez Maya, Akron, OH (US)

(73) Assignee: The University of Akron, Akron, OH (US)

(*) Notice: Subject to any disclaimer, the term of this patent is extended or adjusted under 35 U.S.C. 154(b) by 49 days.

(21) Appl. No.: 15/128,611

(22) PCT Filed: Apr. 23, 2015

(86) PCT No.: PCT/US2015/027275
§ 371 (c)(1),
(2) Date: Sep. 23, 2016

(87) PCT Pub. No.: WO2015/164592
PCT Pub. Date: Oct. 29, 2015

(65) Prior Publication Data
US 2017/0179546 A1    Jun. 22, 2017

Related U.S. Application Data

(60) Provisional application No. 61/982,996, filed on Apr. 23, 2014.

(51) Int. Cl.
*H02J 7/00* (2006.01)
*H01M 10/00* (2006.01)
(Continued)

(52) U.S. Cl.
CPC ......... *H01M 10/44* (2013.01); *H01M 10/052* (2013.01); *H01M 10/48* (2013.01); *H02J 7/0042* (2013.01); *H02J 7/0052* (2013.01)

(58) Field of Classification Search
CPC ...... H02J 7/0042; H02J 7/0052; H01M 10/44; H01M 10/0052; H01M 10/48
(Continued)

(56) References Cited

U.S. PATENT DOCUMENTS 3,593,197 A * 7/1971 Carreras ................ H03K 3/351
327/569
4,682,262 A * 7/1987 Monsell .................. H02J 7/022
320/137

(Continued)

FOREIGN PATENT DOCUMENTS

JP    2012088177 A  *  5/2012
JP    2012163510 A  *  8/2012
JP    2012242153 A  *  12/2012

*Primary Examiner* — Phallaka Kik
(74) *Attorney, Agent, or Firm* — Renner, Kenner, Greive, Bobak, Taylor & Weber Co. LPA

(57) ABSTRACT

A method for charging batteries that have at least one metal electrode or at least one metal-based compound electrode includes applying a DC signal to the batteries and applying an AC signal to the batteries. The DC signal and AC signal may be combined as a composite signal, which is applied to the batteries, or may be applied to the batteries as separate, independent signals, during a charging cycle. As such, the DC signal serves to charge the batteries, while the AC signal operates to suppress, avoids or reverse the growth of dendrites in the batteries. As a result, the operating life of the batteries is extended, and the electrical storage capacity of the batteries is preserved.

13 Claims, 2 Drawing Sheets

(51) Int. Cl.
*H01M 10/44* (2006.01)
*H01M 10/052* (2010.01)
*H01M 10/48* (2006.01)

(58) Field of Classification Search
USPC ............................... 320/162, 138, 145, 157
See application file for complete search history.

(56) References Cited

U.S. PATENT DOCUMENTS

| | | | | |
|---|---|---|---|---|
| 5,646,505 | A * | 7/1997 | Melnikov | H02J 7/022 320/100 |
| 7,554,294 | B2 * | 6/2009 | Srinivasan | G01R 31/3624 320/128 |
| 8,501,352 | B2 * | 8/2013 | Stux | C01G 39/00 429/231.1 |
| 8,547,041 | B2 * | 10/2013 | Furukawa | B60L 11/1803 318/400.02 |
| 9,966,625 | B2 * | 5/2018 | Zhang | H01M 8/188 |
| 2006/0153109 | A1 * | 7/2006 | Fukumoto | H04B 13/00 370/310 |
| 2008/0024948 | A1 * | 1/2008 | Takamura | H01M 2/348 361/91.1 |
| 2012/0120694 | A1 * | 5/2012 | Tsuchiya | H01L 31/02021 363/97 |
| 2013/0164625 | A1 * | 6/2013 | Manthiram | H01M 4/13 429/231.8 |
| 2014/0084849 | A1 * | 3/2014 | Lee | H02J 7/007 320/107 |
| 2017/0089984 | A1 * | 3/2017 | Sakai | G01R 31/3662 |

* cited by examiner

METHOD FOR CHARGING BATTERIES

CROSS-REFERENCE TO RELATED APPLICATION

This application claims the benefit of U.S. Provisional Application No. 61/982,996 filed Apr. 23, 2014, the contents of which are incorporated herein by reference.

TECHNICAL FIELD

Generally, the present invention relates to batteries and methods of charging such batteries. Particularly, the present invention relates to a method of charging batteries to prevent the formation of dendrites or scaling within the batteries. More particularly, the present invention relates to a method of charging batteries, which have metal electrodes or electrodes formed of metal compounds, using an AC and DC composite signal to prevent the formation of dendrites and scaling, as well as precipitation at the surface of the electrodes of the batteries.

BACKGROUND ART

With the rapid development of portable electronic devices, there has been tremendous research in the area of rechargeable batteries, which are used to power such portable devices. As a result, many different rechargeable battery chemistries have been developed, such as lithium-metal and lithium compound chemistries, which have been used to form the electrodes (e.g. anode or cathode) in such batteries, due to their highly negative redox potential and high theoretical specific capacity. Furthermore, other batteries have been developed that use various metal-based electrodes, or metal compound-electrodes, such as zinc-metal type rechargeable batteries for example. The development of such metal-electrode rechargeable batteries has been limited because of the problems associated with the reversibility of the deposition-dissolution process that occurs at the interface of the electrodes and the electrolyte in such batteries. In particular, such problems have impeded the performance of such metal-electrode batteries and have reduced their reliability for use in commercial applications. The limited reversibility of the deposition-dissolution process is due to the formation of a non-homogeneous film on the metal-anode surface, which causes a non-uniform current density to form across the metal surface under an applied current or voltage potential. The film, referred to as a solid electrolyte interphase (SEI) film, includes various homogeneous and heterogenous reaction products, which is a result of the reaction that occurs between the interface of the metal electrodes or metal-based compound electrodes and the electrolyte solution.

The inhomogeneity of the created SEI film forms unwanted conduction pathways, which have different solid state conductivities, such as inorganic layer conductivities and organic layer conductivities in the case of lithium-ion batteries, which, in turn, cause preferential deposition or dissolution at some specific sites within the battery. This results in uneven deposition and dissolution of the metal at the electrode surface of the battery. Batteries that utilize conventional aprotic electrolytes, such as lithium salts dissolved in a carbonate-based solvent, react to form several products, as well as species with Li—C (lithium-carbon) bonds, which contribute to the complicated surface chemistry of the lithium material. These various surface reactions cause the formation of insoluble surface species. For example, surface films formed on the lithium metal, lithium based compounds or other metals are heterogeneous in nature, and they can be easily cracked due to mechanical or chemical processing that occurs during lithium deposition and dissolution, while some active sites may also be exposed. Due to these heterogeneous deposition-dissolution mechanisms, acicular crystals or arborescence shape of lithium or other metal are formed, which are referred to as dendrites. The continuous formation and growth of the dendrites cause short-circuits to be formed between the structures forming the electrodes of the battery. This results in the irreversible loss of the electrical storage capacity of the battery and the development of reduction products that passivate the newly-formed surface, which is undesirable for such metal-anode type batteries, due to the negative effects the dendrites have on the safety of the battery and the operating life of the battery.

Therefore, there is a need for a method of recharging a battery, such as a battery that utilizes a metal electrode or that utilizes metal-based compound electrodes, that are subject to dendritic growth, which is capable of preventing or at least slowing the rate of such dendritic growth or precipitation at the surface of the electrodes of the battery. In addition, there is a need for a method of charging a battery, such as a metal-electrode or metal-based compound electrode battery, while extending the operating life of the battery.

SUMMARY OF THE INVENTION

In light of the foregoing, it is a first aspect of the present invention to provide a method of charging a battery, such as a metal electrode battery or metal-based compound electrode battery.

It is a further aspect of the present invention to provide a method of charging a battery having at least one electrode formed of metal or formed of a metal-based compound, applying a DC (direct current) signal to the electrodes of the battery and applying an AC (alternating current) signal to the electrodes of the battery, wherein the application of the DC and AC signals chargers the battery and prevents, avoids or reverses the formation of dendrites within the battery.

BRIEF DESCRIPTION OF THE DRAWINGS

These and other features and advantages of the present invention will become better understood with regard to the following description, appended claims, and accompanying drawings, wherein:

FIG. 2b is a cross-sectional view of the lithium battery cell shown in FIG. 2a.

DETAILED DESCRIPTION OF THE INVENTION

A method of charging a battery is provided by the present invention. In particular, while the discussion that follows relates to the use of the charging method of the present invention to charge lithium-ion based batteries, such charging method can be used to charge any battery that is subject to dendritic growth, such as metal-electrode (anode/cathode) batteries, including zinc-ion or lithium ion batteries for example. In other words, the battery charging method of the present invention may be utilized with any battery having at least one metal-electrode (anode or cathode) or at least one metal-based compound electrode (anode or cathode). Particularly, a metal-based compound electrode is an electrode formed of a metal containing compound.

Figure 1:
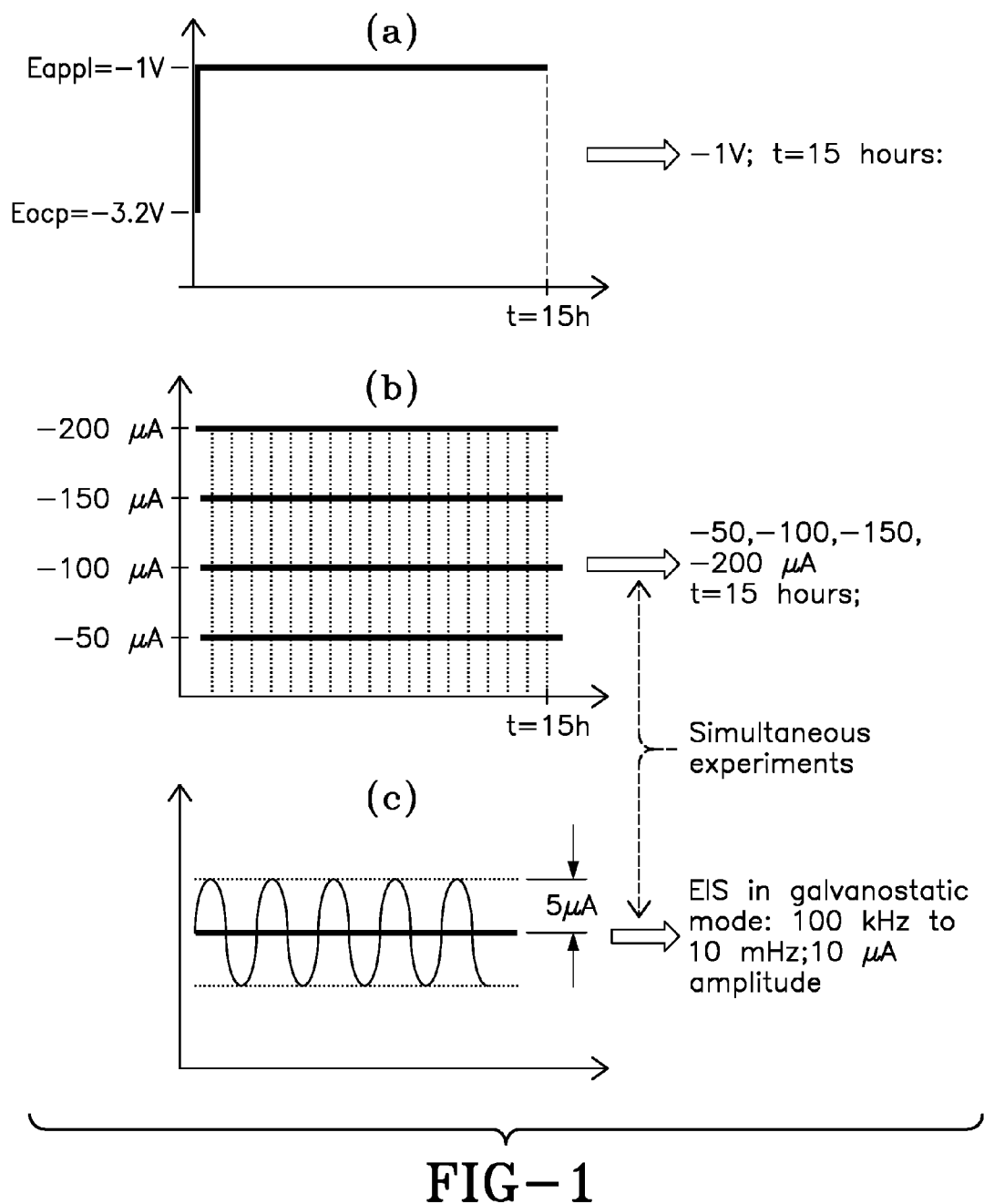
FIG. 1a is a graph showing the anodic potential of −1.0V vs. a rest potential that was applied during 15 hours to a lithium battery.
FIG. 1b is a graph showing the DC current vs. rest potential that was applied during 15 hours to the battery.
FIG. 1c is a graph showing the response of the battery using a Galvanostatic Electrochemical Impedance Spectroscopy (GEIS) technique.
Figure 2A:
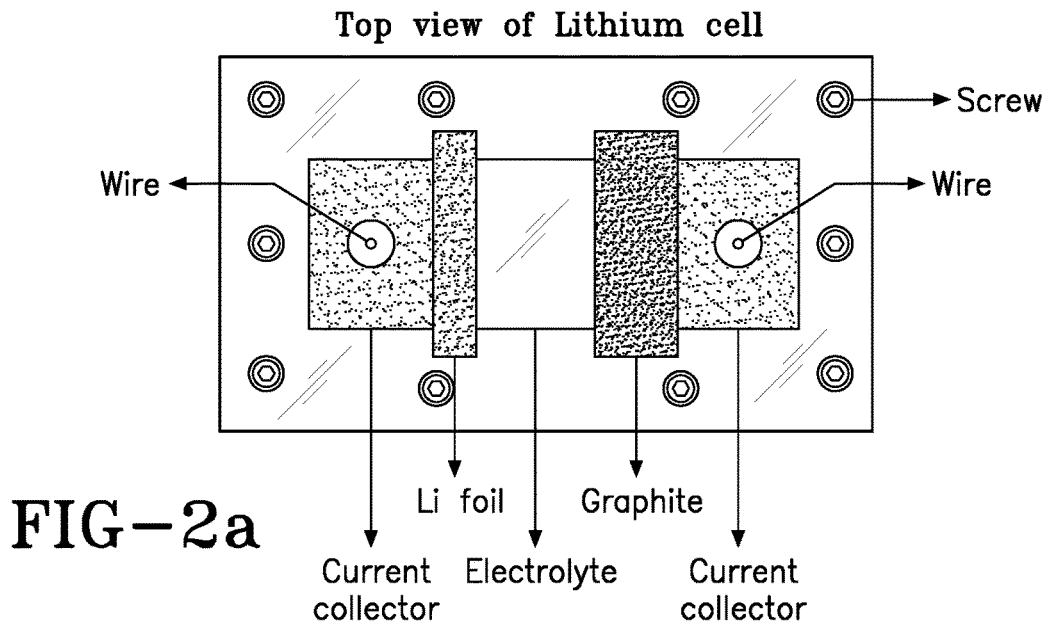
FIG. 2a is a top plan view of the lithium battery cell.
Figure 2B:
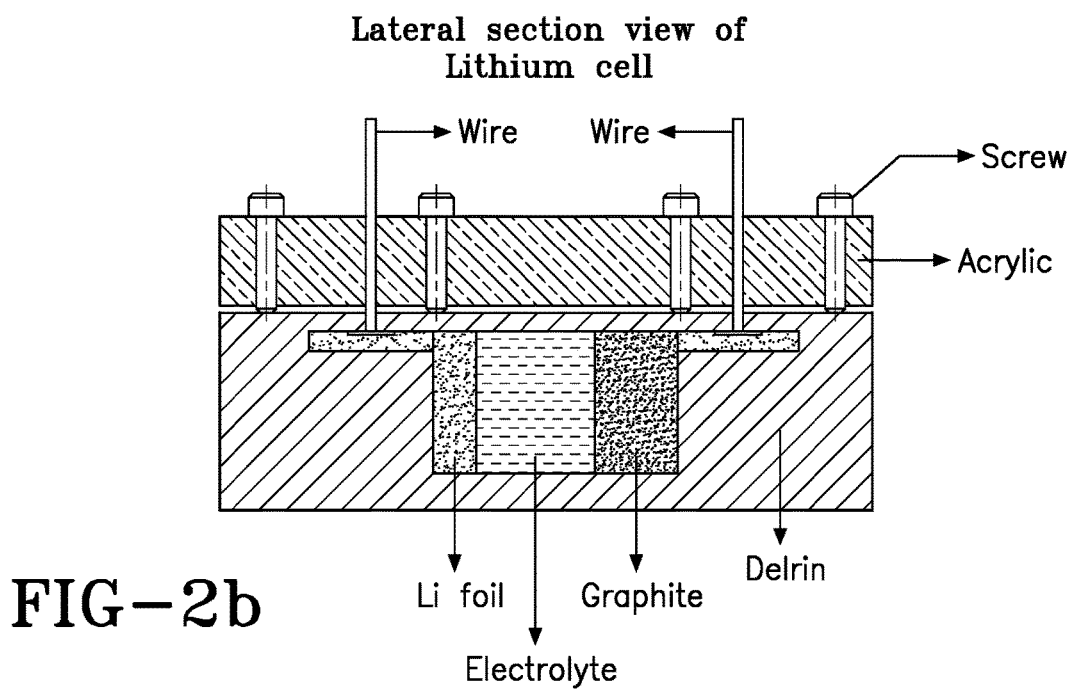

Specifically, the method of charging a battery of the present invention was evaluated, such that dendrite formation/growth within the battery was characterized in real-time by electrochemical techniques, while dendrite growth was recorded in a visual lithium battery cell 10, shown in FIG. 2a-b. The electrochemical characterization of the dendrite formation/growth was made by EIS (Electrochemical Impedance Spectroscopy) in a galvanostatic mode, using the experimental setup shown in FIGS. 1a-c.

In addition, the electrochemical confirmation of the growth of dendrites in the battery 10 was carried out according to the following procedure shown in FIGS. 1a-c, as follows: a.) an anodic potential of −1.0 V vs. rest potential was applied during 15 hours to the electrode of the battery 10 experiencing the dendrite growth (i.e. working electrode); after this time, b.) a DC current vs. rest potential was applied to the battery 10 during 15 hours, while c.) a GEIS (Galvanostatic Electrochemical Impedance Spectroscopy) using a frequency range from about 100 KHz to 10 MHz and an amplitude of about 5 μA was used to study the battery 10. Electrical currents defined with respect to the electrode surface area were applied to the battery 10 for the following current magnitudes: −50 μA, −100 μA, −150 μA, and −200 μA.

Digital video was used to record, with the lens facing the gap between the electrodes of the battery 10, during the exposed time when the galvanostatic technique was initially applied. The recording was made in the visual lithium cell 10 shown in FIGS. 2a-b.

Thus, lithium-ion batteries form dendrites (i.e. lithium precipitates of different morphologies) after the completion of a finite number of charge/discharge cycles. In particular, the dendrites are precipitated in certain locations of the battery as the charge/discharge cycles are completed.

Typically, while lithium ion batteries are charged using a DC (direct current) signal, the present invention contemplates a charging method, whereby a DC (direct current) charging signal is combined with an AC (alternating current) signal, to form a composite charge signal, which is applied across the electrodes (anode/cathode) of the battery. That is, the composite charge signal comprises an AC signal with a specific amplitude, which is larger than a low field amplitude, and that includes a DC bias or offset. As a result, the formation of dendrites is suppressed and avoided within the battery. That is, the DC portion (i.e. DC charging signal) of the composite charge signal serves to charge the battery, while the AC portion (i.e. AC charging signal) of the composite charge signal serves to recondition the electrochemical structures of the battery by preventing, reducing, or avoiding the dendritic growth in the battery. Thus, the composite AC/DC signal is capable of simultaneously charging and re-conditioning the battery. Moreover, the amplitude and frequency of the composite AC/DC charging signal can be chosen to optimize the inhibition of the precipitation and growth process of the dendrites. It should also be appreciated that the electrical current distribution and the electrochemical process that is generated to impede the dendrite formation in the lithium-ion batteries by the composite AC/DC signal may be achieved, whereby the AC component is either an electrical current or voltage. It is also contemplated that the applied AC/DC composite signal may be provided as part of various charging cycles. It should be appreciated that in one aspect, in lieu of the composite signal, the DC and AC signals may be applied independently during separate time periods of a charging cycle, or may be applied together simultaneously to the battery. It should be appreciated that the DC and AC signals may be applied separately in any sequence or any order, and may be applied multiple times in any sequence or order, and for any desired period of time.

In other aspects, the DC and AC signals may be applied to the battery during periodic time intervals individually or simultaneously, as in the case of the composite signal.

It should also be appreciated that the AC/DC composite signal used to charge the lithium-ion battery may have various operational characteristics. For example, the DC bias component of the composite charging signal may be any suitable DC amplitude for charging batteries. In addition, the AC component of the composite charging signal may have any suitable amplitude, such as a current amplitude of from about 1 uA to 30 uA, or a voltage amplitude of from about 2 mV to 30 mV for example; however, any suitable magnitude may be used. It should also be appreciated that the frequency of the AC component of the composite charging signal may be from about 0.1 Hz to 400 Hz, such as 60 Hz for example.

The battery-charging method of the present invention set forth above may be embodied in hardware, software, or a combination of both. In one aspect, a processor may be programmed with the charging method discussed above using any suitable technique. For example, the processor may be configured to control a power source that is capable of supplying the necessary DC and AC components of the composite charging signal (or individual AC and DC signals) to the electrodes of the battery to be charged. In addition, the processor is configured to monitor the charge status of the battery, so as to terminate the charging sequence when the battery has been fully charged. The processor may also include a suitable user interface to allow a user to control the various charge modes and to set the various operational characteristics of the DC and AC signals used to charge the battery. It is also contemplated that the processor may be programmed to automatically select the optimal operational characteristics (e.g. magnitude, frequency, etc.) of the DC and AC signals used based on the type of battery to be charged. In a further aspect, the present invention may include a system having a suitable processor to indicate the charge status (e.g. fully charged or not fully charged; or any states there between) of the battery before any further failure or damage to the battery occurs based on the AC bias signal.

Thus, one advantage of the present invention is that a battery charging method is configured to utilize a threshold amplitude of an AC electrical signal to avoid or inhibit the formation of dendrites or precipitates at the surface of one or more metal electrodes or metal-based compound electrodes in the electrochemical cell of a rechargeable battery. Another advantage of the present invention is that the battery charging method utilizes a conventional DC (direct current) signal in addition to an AC (alternating current) signal to charge and re-condition the batteries simultaneously in the case of a composite signal, or separately in discrete steps or stages. Still another advantage of the present invention is that the battery charging method uses an AC signal to re-condition the batteries that can be set at various frequencies for charge cycling, and to optimize the re-conditioning process based on the battery chemistry used.

Thus, it can be seen that the objects of the present invention have been satisfied by the structure and its method for use presented above. While in accordance with the Patent Statutes, only the best mode and preferred embodiments have been presented and described in detail, with it being understood that the present invention is not limited thereto or thereby. Accordingly, for an appreciation of the true scope and breadth of the invention, reference should be made to the following claims.

What is claimed is:

1. A method for charging a battery having two or more electrodes, wherein at least one of the electrodes is formed of metal or a metal-based compound, the method comprising:
   identifying a chemistry of the battery;
   applying a DC (direct current) signal to the electrodes of the battery to charge the battery;
   applying an AC (alternating current) signal to the electrodes of the battery to recondition the battery; and
   adjusting one or more of a frequency and an amplitude of said AC signal based on said chemistry of the battery.

2. The method of claim 1, wherein said DC signal and said AC signal are applied simultaneously to the electrodes of the battery as a composite signal.

3. The method of claim 1, wherein said DC signal and said AC signal are alternatingly applied to the electrodes of the battery.

4. The method of claim 1, wherein said AC signal has a current amplitude that is from about 1 uA to 30 uA.

5. The method of claim 1, wherein said AC signal has a voltage amplitude that is from about 2 mV to 30 mV.

6. The method of claim 1, wherein said AC signal has a frequency that is from about 0.1 Hz to 400 Hz.

7. The method of claim 1, wherein said AC signal has a frequency of about 60 Hz.

8. The method of claim 1, further comprising:
   detecting when said battery has been fully charged, such that when said battery has been fully charged, said applying steps are deactivated.

9. The method of claim 1, wherein the at least one metal electrode or metal-based compound electrode comprises an anode.

10. The method of claim 1, wherein the at least one metal electrode or metal-based compound electrode comprises a cathode.

11. The method of claim 1, wherein the at least one metal electrode or metal-based compound electrode comprises lithium metal or a lithium based compound, respectively.

12. The method of claim 1, wherein said AC signal is offset by said DC signal.

13. The method of claim 1, wherein said AC signal and said DC signal are a composite signal.

* * * * *